(12) United States Patent
Dadheech et al.

(10) Patent No.: US 11,007,507 B2
(45) Date of Patent: May 18, 2021

(54) SELF-CLEANING FILM SYSTEM

(71) Applicant: GM Global Technology Operations LLC, Detroit, MI (US)

(72) Inventors: Gayatri V. Dadheech, Bloomfield Hills, MI (US); Thomas A. Seder, Fraser, MI (US); James A. Carpenter, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 260 days.

(21) Appl. No.: 15/972,838

(22) Filed: May 7, 2018

(65) Prior Publication Data

US 2019/0336946 A1    Nov. 7, 2019

(51) Int. Cl.
   *C09D 5/00* (2006.01)
   *C09D 127/18* (2006.01)
   (Continued)

(52) U.S. Cl.
   CPC ............... *B01J 23/50* (2013.01); *B01J 21/18* (2013.01); *B01J 31/06* (2013.01); *B01J 35/004* (2013.01);
   (Continued)

(58) Field of Classification Search
   CPC ..... Y10T 428/24355; Y10T 428/24364; Y10T 428/24372; Y10T 428/24413; Y10T 428/24802; Y10T 428/24893; Y10T 428/24909; Y10T 428/24942; Y10T 428/2495; Y10T 428/24959; Y10T 428/24967; Y10T 428/24975; Y10T 428/25; Y10T 428/256; Y10T 428/26; Y10T 428/261; Y10T 428/263; Y10T 428/264; Y10T 428/265; Y10T 428/266;
   (Continued)

(56) References Cited

U.S. PATENT DOCUMENTS 6,037,289 A * 3/2000 Chopin ................ C01G 23/047
                                                        502/2
9,861,974 B2   1/2018 Dadheech et al.
(Continued)

FOREIGN PATENT DOCUMENTS

CN     1120819 A     4/1996
CN   101485974 A     7/2009
(Continued)

OTHER PUBLICATIONS

Machine translation (Google Patents) of CN 102838889 A. Translated Nov. 5, 2020. (Year: 2020).*
(Continued)

*Primary Examiner* — Maria V Ewald
*Assistant Examiner* — Ethan A. Utt
(74) *Attorney, Agent, or Firm* — Harness, Dickey & Pierce, P.L.C.

(57) ABSTRACT

A self-cleaning film system includes a substrate and a self-cleaning film disposed on the substrate. The self-cleaning film includes a monolayer formed from an oleophobic material, and a first plurality of regions disposed within the monolayer in a non-periodic pattern such that each of the
(Continued)

first plurality of regions abuts and is surrounded by the oleophobic material. Each of the first plurality of regions includes a photocatalytic material.

36 Claims, 3 Drawing Sheets

(51) Int. Cl.
| | |
|---|---|
| C09D 1/00 | (2006.01) |
| C09D 7/40 | (2018.01) |
| B01J 23/50 | (2006.01) |
| B01J 35/00 | (2006.01) |
| B01J 21/18 | (2006.01) |
| B01J 31/06 | (2006.01) |

(52) U.S. Cl.
CPC ............ *B01J 35/0013* (2013.01); *C09D 1/00* (2013.01); *C09D 5/00* (2013.01); *C09D 7/67* (2018.01); *C09D 127/18* (2013.01)

(58) Field of Classification Search
CPC .............. Y10T 428/269; Y10T 428/27; Y10T 428/273; Y10T 428/28; Y10T 428/2848; Y10T 428/2852; Y10T 428/2857; Y10T 428/31; Y10T 428/30; Y10T 428/3154; Y10T 428/31544; B32B 3/00; B32B 3/10; B32B 3/26; B32B 3/266; B32B 3/30; B32B 5/00; B32B 5/16; B32B 5/22; B32B 5/30; B32B 7/00; B32B 7/02; B32B 7/04; B32B 7/05; B32B 7/12; B32B 9/00; B32B 9/005; B32B 9/007; B32B 9/04; B32B 9/045; B32B 9/048; B32B 27/00; B32B 27/04; B32B 27/06; B32B 27/08; B32B 27/14; B32B 27/16; B32B 27/32; B32B 27/322; B32B 27/36; B32B 27/365; B32B 33/00; B32B 2255/00; B32B 2255/04; B32B 2255/20; B32B 2255/26; B32B 2255/28; B32B 2264/00; B32B 2264/10; B32B 2264/102; B32B 2305/00; B32B 2305/30; B32B 2307/00; B32B 2307/40; B32B 2307/412; B32B 2307/70; B32B 2307/73; B32B 2307/754; B32B 2551/00; G02B 2207/00; G02B 2207/109; G02B 1/00; G02B 1/04; G02B 1/10; G02B 1/105; G02B 1/11; G02B 1/113; G02B 1/115; G02B 1/14; G02B 1/18; G02B 27/00; G02B 27/0006
USPC ............ 428/141–143, 148, 195.1, 206, 208, 428/212–216, 219, 220, 323, 328, 428/332–337, 339–341, 343, 354, 355 R, 428/356, 409, 408, 421, 422, 446, 448, 428/688, 689, 697, 702; 502/300, 344, 502/347, 349, 350
See application file for complete search history.

(56) References Cited

U.S. PATENT DOCUMENTS

| | | | |
|---|---|---|---|
| 10,052,622 B2 | 8/2018 | Dadheech et al. | |
| 10,274,647 B2 | 4/2019 | Seder et al. | |
| 10,429,641 B2 | 10/2019 | Carpenter et al. | |
| 10,533,249 B2 | 1/2020 | Dadheech et al. | |
| 10,556,231 B2 | 2/2020 | Dadheech et al. | |
| 10,583,428 B2 | 3/2020 | Seder et al. | |
| 2003/0125679 A1* | 7/2003 | Kubota | A61L 29/106 604/265 |
| 2008/0004175 A1* | 1/2008 | Aoshima | B01J 31/123 502/159 |
| 2009/0246514 A1* | 10/2009 | Chiu | C23C 14/022 428/336 |
| 2010/0297206 A1* | 11/2010 | Kim | A01N 59/10 424/409 |
| 2013/0032646 A1* | 2/2013 | Dhiman | B08B 17/065 239/461 |
| 2015/0147523 A1* | 5/2015 | Kumar | C23C 16/0254 428/141 |
| 2017/0056871 A1* | 3/2017 | Dadheech | B01J 31/38 |
| 2017/0075039 A1* | 3/2017 | Hart | G02B 1/14 |
| 2018/0318820 A1 | 11/2018 | Dadheech et al. | |
| 2018/0333756 A1 | 11/2018 | Seder et al. | |
| 2019/0337013 A1 | 11/2019 | Dadheech et al. | |
| 2019/0369389 A1 | 12/2019 | Carpenter et al. | |

FOREIGN PATENT DOCUMENTS

| | | | |
|---|---|---|---|
| CN | 101801868 A | | 8/2010 |
| CN | 102838889 A | * | 12/2012 |
| CN | 103488322 A | | 1/2014 |
| CN | 106477901 A | | 3/2017 |
| CN | 110452588 A | | 11/2019 |
| DE | 102019110787 A1 | | 11/2019 |

OTHER PUBLICATIONS

Ezra Lucas Hoyt Cates, "Development of Visible-to-Ultraviolet Upconversion Phosphors for Light-Activated Antimicrobial Technology", A Dissertation Presented to The Academic Faculty, In Partial Fulfillment Of the Requirements for the Degree Doctor of Philosophy in Environmental Engineering, May 2013, p. 1-227, Georgia Institute of Technology.

Dadheech, Gayatri V. et al., U.S. Appl. No. 16/742,491, filed Jan. 14, 2020 entitled, "Self-Cleaning Film System and Method of Forming Same," 31 pages.

Seder, Thomas A. et al., U.S. Appl. No. 16/782,812, filed Feb. 5, 2020 entitled, "Self-Cleaning Film System and Method of Forming Same," 33 pages.

Seder, Thomas A. et al., U.S. Appl. No. 16/809,056, filed Mar. 4, 2020 entitled, "Textured Self-Cleaning Film System and Method of Forming Same," 31 pages.

* cited by examiner

SELF-CLEANING FILM SYSTEM

INTRODUCTION

The disclosure relates to a self-cleaning film system.

Devices, such as display systems, are often designed to be touched by an operator. For example, a vehicle may include a display system that presents information to an operator via a touchscreen. Similarly, an automated teller machine or kiosk may include a display system that is activated by touch.

Other devices, such as cameras and eyeglasses, generally include a lens surface which may be inadvertently touched by an operator during use. Further, other devices such as vehicles, windows, mirrors, appliances, cabinetry, furniture, cellular telephones, fingerprint scanners, sensors, copiers, medical instruments, and countertops may also include one or more surfaces which may be touched by an operator. Therefore, during use, an operator may deposit fingerprints, bacteria, and/or oils onto such devices and surfaces.

SUMMARY

A self-cleaning film system includes a substrate and a self-cleaning film disposed on the substrate. The self-cleaning film includes a monolayer formed from an oleophobic material, and a first plurality of regions disposed within the monolayer in a non-periodic pattern such that each of the first plurality of regions abuts and is surrounded by the oleophobic material. Each of the first plurality of regions includes a photocatalytic material.

The self-cleaning film may have a first surface and a second surface spaced opposite the first surface and abutting the substrate. The first surface may be substantially free from squalene. Further, the first plurality of regions may not be equally spaced apart from each other along the first surface. In one aspect, the non-periodic pattern may be non-repeating along the first surface such that the first plurality of regions are randomly disposed along the first surface.

In another aspect, the oleophobic material and the photocatalytic material may be present in the self-cleaning film in a ratio of parts by volume oleophobic material to parts by volume photocatalytic material of from 90:10 to 10:90. Each of the first plurality of regions may have a diameter of less than or equal to 3 microns.

In one aspect, the monolayer may have a thickness of from 5 nm to 15 nm. The oleophobic material may be polytetrafluoroethylene. In another aspect, the monolayer may have a thickness of from 40 nm to 60 nm. The oleophobic material may be fluorinated diamond-like carbon.

The photocatalytic material may have an average diameter of from 30 nm to 70 nm. The photocatalytic material may be titanium dioxide and may be present in the first plurality of regions in an anatase form.

In a further aspect, the monolayer may be formed from a plurality of fluorinated diamond-like carbon nanoparticles and may have a thickness of from 5 nm to 60 nm.

The photocatalytic material may be doped with silver. In another aspect, the self-cleaning film may further include a second plurality of regions disposed within the monolayer such that each of the second plurality of regions abuts and is surrounded by the oleophobic material, wherein each of the second plurality of regions includes silver. In a further aspect, the photocatalytic material may include silver and the substrate may be an internal surface defined by a duct.

The substrate may be formed from at least one of silicon dioxide and plastic.

In one aspect, the substrate may further include an adhesion layer formed from a sol-gel material and disposed in contact with the self-cleaning film. The photocatalytic material may be physically trapped in place by the adhesion layer. The photocatalytic material may be chemically bonded to the adhesion layer. The photocatalytic material may be doped with silver. In another aspect, the self-cleaning film may further include a second plurality of regions disposed within the monolayer such that each of the second plurality of regions abuts and is surrounded by the oleophobic material, wherein each of the second plurality of regions includes silver.

In another aspect, the substrate may further include an upconversion layer formed from a luminescent material and disposed in contact with the self-cleaning film. The upconversion layer may be configured for converting a first electromagnetic radiation having a wavelength of from 490 nm to 450 nm to a second electromagnetic radiation having an ultraviolet wavelength of from 10 nm to 400 nm. The substrate may be a display and may include a backlight configured for emitting the first electromagnetic radiation towards the upconversion layer. The photocatalytic material may be doped with silver. In another aspect, the self-cleaning film may further include a second plurality of regions disposed within the monolayer such that each of the second plurality of regions abuts and is surrounded by the oleophobic material, wherein each of the second plurality of regions includes silver.

In an additional aspect, the substrate may further include an anti-reflection film disposed in contact with the self-cleaning film. The anti-reflection film may include a first sheet formed from titanium dioxide; a second sheet formed from silicon dioxide and disposed on the first sheet; and a third sheet formed from titanium dioxide and disposed on the second sheet and in contact with the self-cleaning film.

The first sheet may be formed from titanium dioxide nanoparticles and may have a first thickness of from 25 nm to 40 nm. The second sheet may be formed from silicon dioxide nanoparticles and may have a second thickness of from 25 nm to 40 nm. The third sheet may be formed from titanium dioxide nanoparticles and may have a third thickness of from 25 nm to 35 nm. The substrate may have a fourth thickness of from 40 nm to 60 nm. In one aspect, the photocatalytic material may be doped with silver. In another aspect, the self-cleaning film may further include a second plurality of regions disposed within the monolayer such that each of the second plurality of regions abuts and is surrounded by the oleophobic material, wherein each of the second plurality of regions includes silver.

In another embodiment, a self-cleaning film system includes a substrate and a self-cleaning film disposed on the substrate. The substrate includes a monolayer formed from an oleophobic material selected from one of polytetrafluoroethylene and fluorinated diamond-like carbon; and a first plurality of regions disposed within the monolayer in a non-periodic pattern such that each of the first plurality of regions abuts and is surrounded by the oleophobic material. Each of the first plurality of regions includes titanium dioxide present in anatase form. The non-periodic pattern is non-repeating such that the first plurality of regions are randomly disposed along the self-cleaning film. The oleophobic material and the titanium dioxide are present in the self-cleaning film in a ratio of parts by volume oleophobic material to parts by volume photocatalytic material of 80:20. Each of the first plurality of regions has a diameter of less than or equal to 3 microns, and the titanium dioxide has an average diameter of from 30 nm to 70 nm.

The self-cleaning film system may have a first surface and a second surface spaced opposite the first surface and abutting the substrate, and the first surface may be substantially free from squalene.

The monolayer may be formed from a plurality of fluorinated diamond-like carbon nanoparticles and may have a thickness of from 10 nm to 60 nm.

In one aspect, the substrate may further includes an adhesion layer formed from a sol-gel material and disposed in contact with the self-cleaning film. The photocatalytic material may be physically trapped in place by the adhesion layer.

In another aspect, the substrate may further include an upconversion layer formed from a luminescent material and disposed in contact with the self-cleaning film. The upconversion layer may be configured for converting a first electromagnetic radiation having a wavelength of from 490 nm to 450 nm to a second electromagnetic radiation having an ultraviolet wavelength of from 10 nm to 400 nm. In one aspect, the titanium dioxide may be doped with silver. In another aspect, the self-cleaning film system may further include a second plurality of regions disposed within the monolayer such that each of the second plurality of regions abuts and is surrounded by the oleophobic material, and each of the second plurality of regions may include silver.

In a further embodiment, a self-cleaning film system includes a substrate and a self-cleaning film disposed on the substrate. The self-cleaning film includes a monolayer formed from an oleophobic material; and a first plurality of regions disposed within the monolayer in a non-periodic pattern such that each of the first plurality of regions abuts and is surrounded by the oleophobic material. Each of the first plurality of regions includes a photocatalytic material. The non-periodic pattern is non-repeating such that the first plurality of regions are randomly disposed along the self-cleaning film. Each of the first plurality of regions has a diameter of less than or equal to 3 microns. The substrate further includes an anti-reflection film disposed in contact with the self-cleaning film. The anti-reflection film includes a first sheet formed from titanium dioxide; a second sheet formed from silicon dioxide and disposed on the first sheet; and a third sheet formed from titanium dioxide and disposed on the second sheet and in contact with the self-cleaning film.

The self-cleaning film may have a first surface and a second surface spaced opposite the first surface and abutting the substrate, and the first surface may be substantially free from squalene.

The photocatalytic material may have an average diameter of from 40 nm to 60 nm. The monolayer may be formed from a plurality of fluorinated diamond-like carbon nanoparticles and may have a thickness of from 5 nm to 60 nm. In one aspect, the photocatalytic material may be doped with silver. In another aspect, the self-cleaning film may further include a second plurality of regions disposed within the monolayer such that each of the second plurality of regions abuts and is surrounded by the oleophobic material, wherein each of the second plurality of regions includes silver.

The above features and advantages and other features and advantages of the present disclosure will be readily apparent from the following detailed description of the preferred embodiments and best modes for carrying out the present disclosure when taken in connection with the accompanying drawings and appended claims.

DETAILED DESCRIPTION

Figure 1:
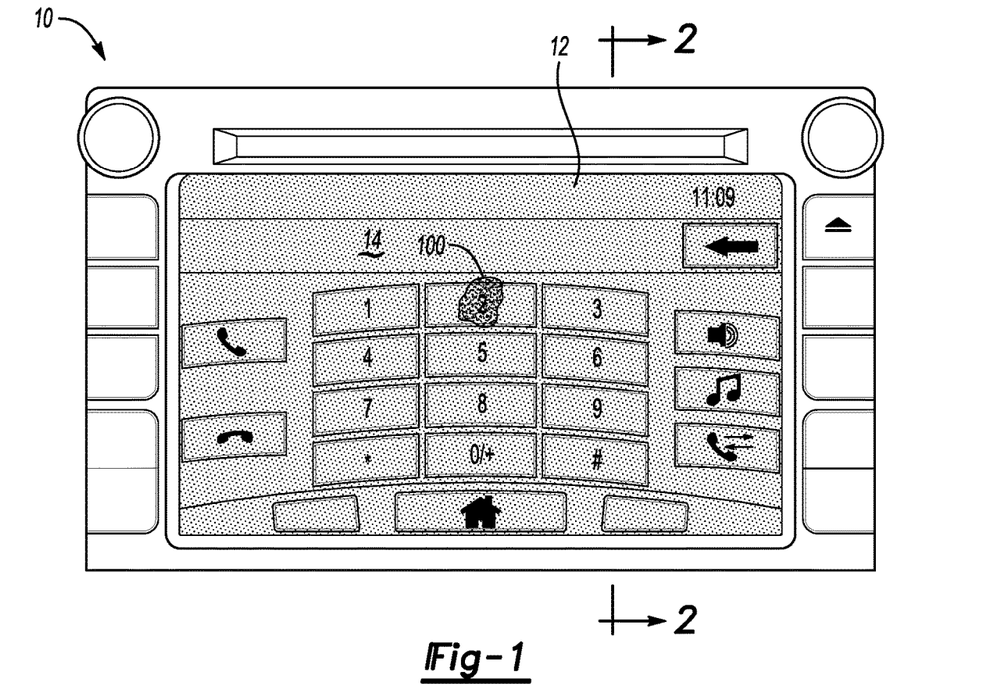
FIG. 1 is a schematic illustration of a front view of a self-cleaning film system including a self-cleaning film disposed on a substrate.

Referring to the Figures, wherein like reference numerals refer to like elements, a self-cleaning film system 10 is shown generally in FIG. 1. The self-cleaning film system 10 may be configured for reducing a visibility or conspicuity of a contaminant 100. For example, the self-cleaning film system 10 may be suitable for applications in which an operator may touch and deposit fingerprints, oils, and/or other organic or carbon-based contaminants 100 or pathogens onto a screen, lens, or surface. More specifically, the self-cleaning film system 10 may be useful for applications requiring a clean, substantially fingerprint-free screen, lens, or surface. That is, the self-cleaning film system 10 may be useful for removing fingerprints and other organic contaminants 100 from such screens, lenses, or surfaces.

For example, the self-cleaning film system 10 may be useful for automotive applications such as in-dash navigation systems which include a touchscreen, or vehicle cameras which include a lens. Alternatively, the self-cleaning film system 10 may be useful for non-automotive applications such as, but not limited to, consumer electronics, cellular telephones, eyewear, personal protective equipment, appliances, furniture, kiosks, fingerprint scanners, medical devices, sensors, aircraft, and industrial vehicles.

Figure 2A:
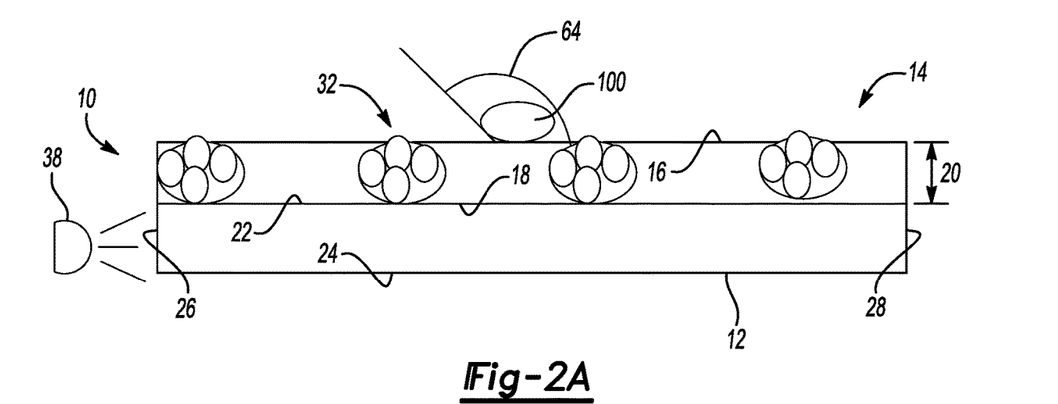
FIG. 2A is a schematic illustration of a cross-sectional view of the self-cleaning film system of FIG. 1 taken along section line 2-2.

Referring now to FIG. 2A, the self-cleaning film system 10 includes a substrate 12. The substrate 12 may be formed from a vitreous, transparent material suitable for refracting visible light. For example, in one embodiment, the substrate 12 may be formed from at least one of silicon dioxide and plastic. In another example, the substrate 12 may be formed from a polycarbonate or other plastic, leather, metal, wood, or composite. The substrate 12 may be configured as, by way of non-limiting examples, a screen of a display system, a lens of eyeglasses or goggles, a visor of a helmet, a surface of a refrigerator, a face of a cabinet, a door panel of a vehicle, a touchscreen of a kiosk, or as another surface or device that may be touched by an operator.

The self-cleaning film system 10 also includes a self-cleaning film 14 disposed on the substrate 12, e.g., chemically bonded or physically bonded to the substrate 12 as set forth in more detail below. The self-cleaning film 14 may be configured to cover and protect the substrate 12 from fingerprints, oils, pathogens, and organic contaminants 100 (FIG. 1). That is, the self-cleaning film 14 may be configured to cause fingerprints, oils, pathogens, and organic contaminants 100 deposited on the self-cleaning film 14 to vanish, disappear, or vaporize so as to maintain a clean substrate 12 that is capable of displaying crisp images or reflections.

More specifically, as described with reference to FIG. 2A, the self-cleaning film 14 may have a first surface 16 and a second surface 18 spaced opposite the first surface 16. The second surface 18 may abut the substrate 12, and the first surface 16 may be substantially free from squalene, organic material, and/or other oils of fatty acids. As used herein, the terminology squalene refers to an organic compound having 30 carbon atoms and represented by the International Union of Pure and Applied Chemistry name (6E,10E,14E,18E)-2,6,10,15,19,23-hexamethyltetracosa-2,6,10,14,18,22-hexaene. In general, the self-cleaning film 14 may be characterized as a thin film and may have a thickness 20 of, for example, from 10 nm to 150 nm.

With continued reference to FIG. 2A, the substrate 12 may have a proximal surface 22 abutting the second surface 18 and a distal surface 24 spaced opposite the proximal surface 22. Therefore, the substrate 12 and the self-cleaning film 14 may be configured to transmit visible light through the proximal surface 22, the distal surface 24, the first surface 16, and the second surface 18. The substrate 12 may also have a first edge 26 connecting the proximal surface 22 and the distal surface 24, and a second edge 28 spaced opposite the first edge 26. In some embodiments, as best shown in FIG. 2C, the substrate 12 may also include an anti-reflection film 50. The anti-reflection film 50 may be configured for reducing a reflection off the self-cleaning film system 10 and thereby improving an efficiency of the self-cleaning film system 10 since lost light in the system 10 may be minimized. As such, the self-cleaning film system 10 has both self-cleaning capabilities and comparatively low reflectance. Although described in more detail below, the anti-reflection film 50 may be formed from an anti-reflection coating comprising alternating layers 52, 54, 56 (FIG. 2C) of silicon dioxide and titanium dioxide.

Figure 2B:
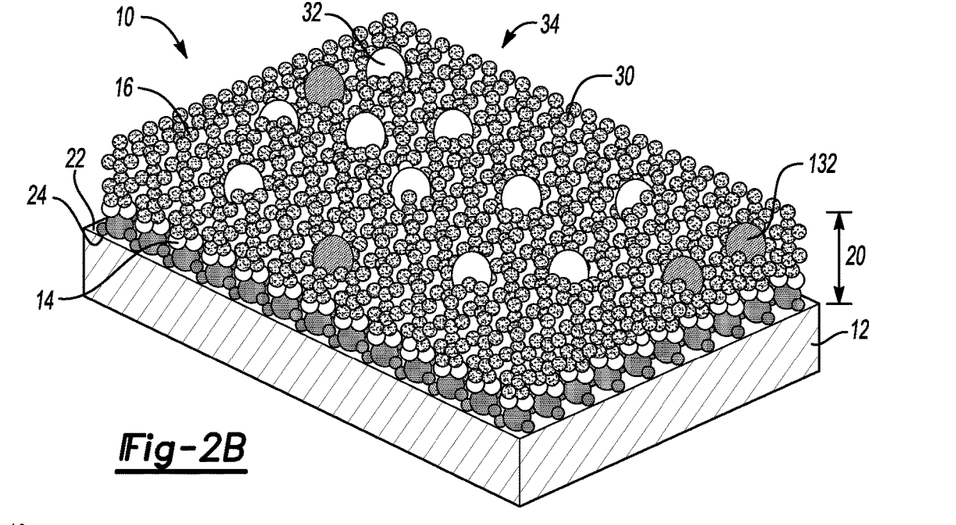
FIG. 2B is a schematic illustration of a perspective view of another embodiment of the self-cleaning film system of FIG. 1.
Figure 2C:
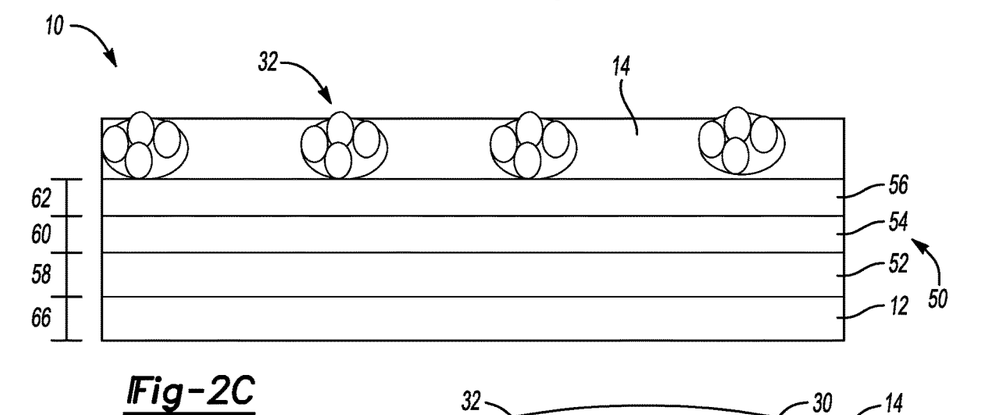
FIG. 2C is a schematic illustration of a cross-sectional view of a further embodiment of the self-cleaning film system of FIG. 1 taken along section line 2-2.

Referring now to FIG. 2B, the self-cleaning film 14 includes a monolayer 30 formed from an oleophobic material. As used herein, the terminology oleophobic may refer to a material that is resistant to or lacks a strong affinity for oil. The oleophobic material may be selected from the group consisting of fluorinated organic compounds, fluorinated inorganic compounds, and combinations thereof. For example, the oleophobic material may be selected from the group consisting of a perfluorocarbon siloxane polymer, polytetrafluoroethylene, diamond-like carbon, fluorinated diamond-like carbon, and fluorinated tin (IV) oxide. In one example, the oleophobic material may be selected from the group consisting of a fluorocarbon polymer, organosiloxane, a fluorinated organosiloxane, and combinations thereof. More specifically, the oleophobic material may be selected from one of polytetrafluoroethylene and fluorinated diamond-like carbon. For example, in one embodiment, the oleophobic material may be a fluorinated material, such as fluorinated diamond-like carbon. In another embodiment, the oleophobic material may be polytetrafluoroethylene.

As best shown in FIG. 2B, the monolayer 30 may form a majority of the self-cleaning film 14 and may be characterized as a monolayer field. As used herein, the terminology monolayer refers to a layer having a thickness 20 of one molecule. That is, the monolayer 30 is one molecule thick and may be characterized as a thin layer. In particular, the monolayer 30 may have a thickness 20 of from 5 nm to 15 nm, e.g., 10 nm, when the monolayer 30 is formed from polytetrafluoroethylene. Alternatively, the monolayer 30 may have a thickness 20 of from 40 nm to 60 nm, e.g., 45 nm or 50 nm or 55 nm, when the monolayer 30 is formed from fluorinated diamond-like carbon. In another embodiment, the monolayer 30 may be formed from a plurality of fluorinated diamond-like carbon nanoparticles and may have a thickness 20 of from 5 nm to 60 nm, e.g., 10 nm or 15 nm or 20 nm or 25 nm or 30 nm or 35 nm or 40 nm or 45 nm or 50 nm or 55 nm. That is, for some embodiments, the monolayer 30 may be formed from particles measureable on the nanometer scale, i.e., fluorinated diamond-like carbon nanoparticles, and may have a thickness 20 of from 10 nm to 60 nm. Thicknesses outside the aforementioned ranges may diminish the optical transparency, workability, and oleophobicity of the self-cleaning film 14. For example, an increased thickness 20 of the monolayer 30 may compromise the optical transparency of the self-cleaning film 14.

As best shown in FIG. 2B, the self-cleaning film 14 also includes a first plurality of regions 32 disposed within the monolayer 30 in a non-periodic pattern 34 such that each of the first plurality of regions 32 abuts and is surrounded by the oleophobic material. In particular, the first plurality of regions 32 may be situated within and along the monolayer 30 but may not be covered by the oleophobic material. Further, the first plurality of regions 32 may not be equally spaced apart from each other along the first surface 16. Rather, the non-periodic pattern 34 may be non-repeating along the first surface 16 such that the first plurality of regions 32 are randomly disposed along the first surface 16. That is, the first plurality of regions 32 may be randomly spaced throughout the monolayer 30 along the first surface 16, and the first plurality of regions 32 may be non-uniformly spaced apart from one another along the first surface 16. Stated differently, the monolayer 30 and the first plurality of regions 32 may be situated or arranged in a patch field of varying size, ratio, and pattern 34 so that the non-periodic pattern 34 is aperiodic or chaotic. As such, the non-periodic pattern 34 may sufficiently scatter light so as to minimize diffraction within the self-cleaning film system 10.

The first plurality of regions 32 may be present in the self-cleaning film 14 in an amount of from about 10 parts by volume to about 90 parts by volume based on 100 parts by volume of the self-cleaning film 14. More specifically, the oleophobic material and the photocatalytic material may be present in the self-cleaning film 14 in a ratio of parts by volume oleophobic material to parts by volume photocatalytic material of from 90:10 to 10:90. For example, the oleophobic material and the photocatalytic material may be present in the ratio of 85:15 or 80:20 or 75:25 or 70:30 or 65:35 or 60:40 or 55:45 or 50:50 or 45:55 or 40:60 or 35:65 or 30:70 or 25:75 or 20:80 or 15:85. In one example, the oleophobic material and the titanium dioxide may be present in the self-cleaning film 14 in a ratio of parts by volume oleophobic material to parts by volume photocatalytic material of 80:20. At ratios less than 10:90, the self-cleaning film 14 may not be optically transparent, may not remove squalene or other contaminants 100 from the self-cleaning film 14, and/or may not prevent contaminant 100 or squalene adhesion to the self-cleaning film 14.

Each of the first plurality of regions 32 includes the photocatalytic material. The photocatalytic material may provide the self-cleaning film 14 with self-cleaning capability. That is, the photocatalytic material may oxidize and/or vaporize organic material, e.g., squalene, present on the first surface 16 of the self-cleaning film 14, as set forth in more detail below. In particular, the photocatalytic material may be a light-activated photocatalyst upon exposure to, for example, visible or ultraviolet light.

Suitable photocatalytic materials may include, but are not limited to, photo-oxidative semiconductors, semiconducting oxides, doped metal oxides, heterojunction materials, and combinations thereof. For example, the second material may be titanium dioxide. In one embodiment, the photocatalytic material may be titanium dioxide and may be present in an anatase form, which may exhibit a comparatively higher photocatalytic activity than a rutile form of titanium dioxide. Further, the photocatalytic material may be doped to form a functionalized photocatalytic material, e.g., functionalized titanium dioxide. For example, the functionalized photocatalytic material may be doped with a metal such as, but not limited to, chromium, cobalt, copper, vanadium, iron, silver, platinum, molybdenum, lanthanum, niobium, and combinations thereof. In one embodiment, the photocatalytic material may be doped with silver. Alternatively, the functionalized photocatalytic material may be doped with a non-metal such as, but not limited to, nitrogen, sulfur, carbon, boron, potassium, iodine, fluorine, and combinations thereof.

For example, in another embodiment described with continued reference to FIG. 2B, the self-cleaning film 14 may include a second plurality of regions 132 disposed within the monolayer 30 such that each of the second plurality of regions 132 abuts and is surrounded by the oleophobic material, wherein each of the second plurality of regions 132 includes silver.

That is, the second plurality of regions 132 may also be situated within and along the monolayer 30. In one embodiment, the second plurality of regions 132 may be equally spaced apart from each other along the first surface 16. In other embodiments, the second plurality of regions 132 may be randomly spaced throughout the monolayer 30 along the first surface 16. In still other embodiments, the second plurality of regions 132 may be arranged in the non-periodic pattern 34 within the monolayer 30.

The silver may be characterized as a nanoparticle and may have an average diameter measureable on a nanometer scale. Alternatively, the silver may be characterized as a particle and may have an average diameter measureable on a micrometer scale. Generally, the silver may be present in the self-cleaning film 14 in an amount of from about 2 parts by volume to about 35 parts by volume based on 100 parts by volume of the self-cleaning film 14. The silver may provide the self-cleaning film 14 with anti-microbial and air-purifying properties and soil-resistance. For example, the silver may disrupt microbe cellular function. In particular, the silver may contribute to phospholipid decomposition such that a microbe cell well cannot undergo respiration.

Therefore, for embodiments including silver or another dopant, the self-cleaning film 14 may be a tribrid film including the oleophobic material, the photocatalytic material, and silver. Alternatively, for embodiments that do not include silver or other dopant, the self-cleaning film 14 may be a hybrid film including the oleophobic material and the photocatalytic material.

Figure 3:
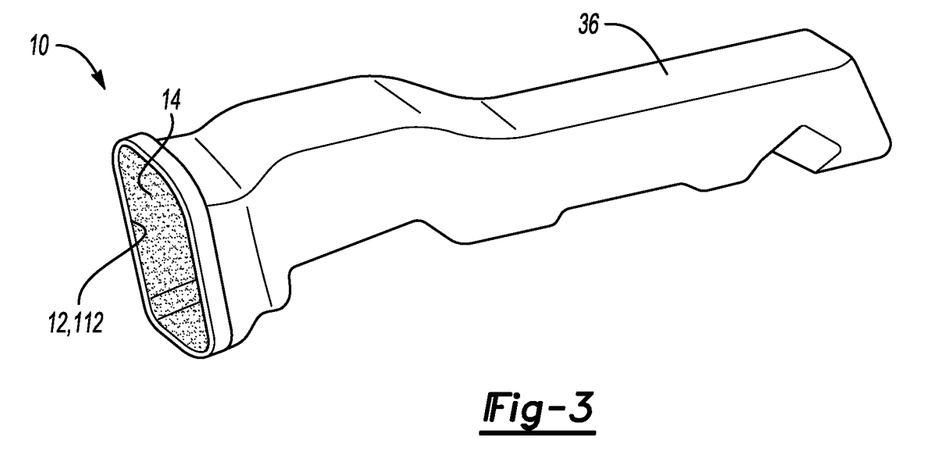
FIG. 3 is a schematic illustration of a perspective view of a duct including the self-cleaning film of FIGS. 1-2E.

Referring now to FIG. 3, in one embodiment, the photocatalytic material may include silver and the substrate 12 may be an internal surface 112 defined by a duct 36 or conduit. For example, the duct 36 may be a channel or conduit configured for transmitting and directing airflow or other fluid flow with a vehicle, building, structure, or device. In particular, the duct 36 may be a component of a heating, ventilation, and air conditioning system for an automotive vehicle. The self-cleaning film 14 may be disposed on the substrate 12, e.g., the internal surface 112 defined by the duct 36 or vent, and may clean or sanitize the air or fluid flowing through the duct 36. That is, the silver, in combination with the photocatalytic material and oleophobic material, may impart a self-cleaning property to the duct 36 and may protect the internal surface 112 from dust and air pollutants; purify the air pollutants near or on the internal surface 112; decompose an organic pollutant on the internal surface 112; reduce energy consumption required for cooling an atmosphere near the duct 36; restrain mildew and/or algae growth; and/or attack bacteria and viruses on the internal surface 112 and in the atmosphere surrounding the duct 36.

For this embodiment, the self-cleaning film 14 may be applied to the internal surface 112 defined by the duct 36 by, for example, dip-coating processes, bar coating processes, spin coating processes, flow coating processes, roll coating processes, painting, ink jet printing, and the like.

The photocatalytic material may be characterized as a nanoparticle and may have an average diameter measureable on a nanometer scale. That is, the photocatalytic material may have an average diameter of from 30 nm to 70 nm. For example, the photocatalytic material may have an average diameter of from 40 nm to 60 nm. As further examples, the photocatalytic material may have an average diameter of 35 nm or 40 nm or 45 nm or 50 nm or 55 nm or 60 nm or 65 nm. In one embodiment, the photocatalytic material may have an average diameter of about 50 nm. At average diameters of less than 30 nm or greater than 70 nm, the photocatalytic material may scatter light and/or insufficiently photocatalyze the contaminant 100. Generally, the photocatalytic material may be present in the self-cleaning film 14 in an amount of from about 10 parts by volume to about 35 parts by volume based on 100 parts by volume of the self-cleaning film 14.

Further, as described with continued reference to FIG. 2B, each of the first plurality of regions 32 may have a diameter of less than or equal to 3 microns to reduce sparkles visible on the self-cleaning film 14. That is, at diameters of greater than 3 microns, sparkling and refracted light may be visible to a user, which may interfere with an optical transparency or usability of the self-cleaning film 14, particularly for applications in which the self-cleaning film 14 is applied to a display 212 (FIG. 2E).

In other non-limiting embodiments, the first plurality of regions 32 may include a semiconducting oxide such as, but not limited to, zinc oxide, bismuth, tin oxide, and combinations thereof. The semiconducting oxide may be selected to have a band gap separation suitable for a photocatalytic reaction, as set forth in more detail below.

Referring again to FIG. 2A, the self-cleaning film 14 may define a contact angle 64 with water of greater than 140°. For example, the self-cleaning film 14 may define a contact angle 64 with water of greater than or equal to 150°. As such, water, oils, and contaminants 100 may effectively bead on and translate across the first surface 16. Stated differently, water, oils, and contaminants 100 may be mobile and effectively translate along the first surface 16 and the self-cleaning film 14 may not be wettable.

With continued reference to FIG. 2A, the self-cleaning film system 10 may further include a light source 38 disposed adjacent the first edge 26 and configured for emitting electromagnetic radiation. For example, the light source 38 may be an ultraviolet light-emitting diode and the electromagnetic radiation may have a wavelength of from 400 nm to 100 nm. Alternatively, the light source 38 may be an incandescent bulb or a visible light-emitting diode and the electromagnetic radiation may have a wavelength of from 740 nm to 380 nm.

Figure 2D:
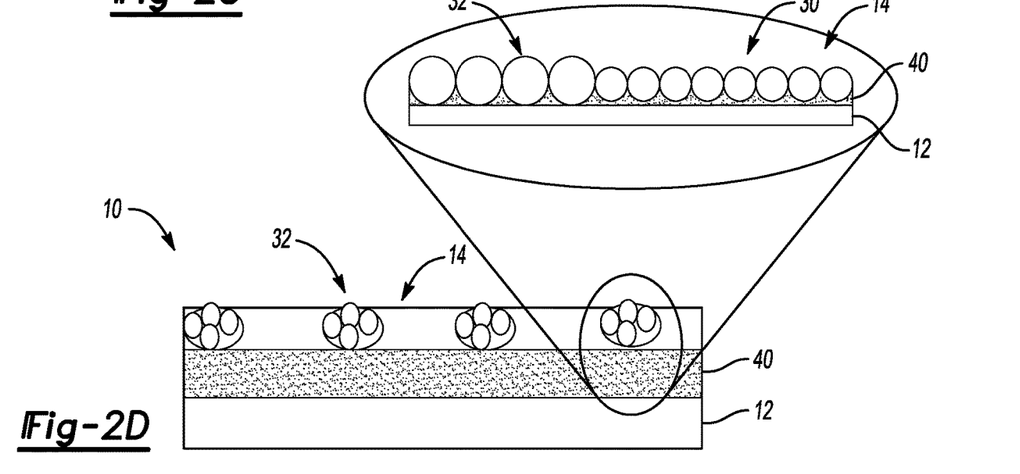
FIG. 2D is a schematic illustration of a cross-sectional and magnified view of an additional embodiment of the self-cleaning film system of FIG. 1 taken along section line 2-2.
Figure 2E:
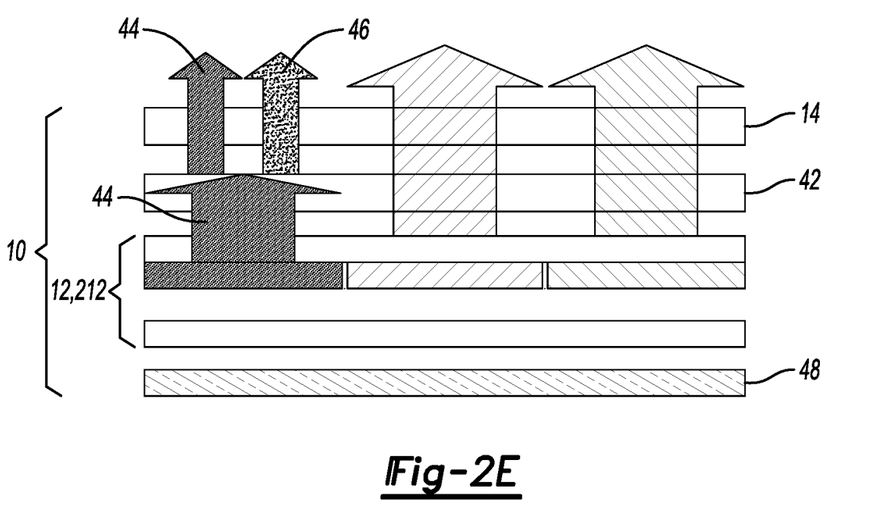
FIG. 2E is a schematic illustration of an exploded cross-sectional view of another embodiment of the self-cleaning film system of FIG. 1 taken along section line 2-2.

Referring now to FIG. 2D, in one embodiment, the substrate 12 may further include an adhesion layer 40 formed from a sol-gel material and disposed in contact with the self-cleaning film 14. The adhesion layer 40 may be included for embodiments that include nanoparticles deposited onto a substrate 12 formed from silicon dioxide, since such nanoparticles may not otherwise chemically bond or chemisorb onto the silicon dioxide substrate 12. That is, without the adhesion layer 40, the nanoparticles may only be held in place on the substrate 12 by comparatively weak van der Walls forces or physisorbed onto the silicon dioxide substrate 12. Such comparatively weaker physical bonding may allow nanoparticles to be scratched off of the substrate 12 during use.

The substrate 12 may include the adhesion layer 40 or the adhesion layer 40 may be separately applied and disposed on the substrate 12 so as to be sandwiched between the self-cleaning film 14 and the substrate 12. In particular, the adhesion layer 40 may be formed from a silicon alkoxide precursor. However, other suitable alkoxide precursors may be formed from titanium, tin, zirconium, cerium, and other metals. The silicon alkoxide precursor may be hydrolyzed and condensed to form a gel network defining pores filled with liquid. The gel network may be heated to vaporize the liquid from the pores, form additional linkages in the gel network, and shrink the gel network to thereby form the gel. Consequently, the photocatalytic material, i.e., the nanoparticles, may be physically trapped in place by the adhesion layer 40, i.e., restrained in place in the gel. For nanoparticles that are also metal oxides, the photocatalytic material may also be chemically bonded to the adhesion layer 40.

Referring now to FIG. 2E, in another embodiment, the substrate 12 may further include an upconversion layer 42 formed from a luminescent material and disposed in contact with the self-cleaning film 14. The upconversion layer 42 may be included for embodiments that include the photocatalytic material, but are not otherwise exposed to sufficient electromagnetic radiation in an ambient operating environment during use of the self-cleaning film 14 to sufficiently photocatalyze contaminants 100. For example, the upconversion layer 42 may enable operation of the self-cleaning film 14 even during darkness.

More specifically, the upconversion layer 42 may harvest and convert other wavelengths of electromagnetic radiation 44 to supply the photocatalytic material with an ultraviolet wavelength of electromagnetic radiation 46 during operation of the self-cleaning film 14. In particular, the upconversion layer 42 may be configured for converting a first electromagnetic radiation 44 having a wavelength of from 490 nm to 450 nm, i.e., blue light, to a second electromagnetic radiation 46 having an ultraviolet wavelength of from 10 nm to 400 nm, i.e., ultraviolet light. Therefore, the self-cleaning film system 10 may not require additional stand-alone ultraviolet-emitting diodes and/or drive circuits to generate enough ultraviolet electromagnetic radiation 46 to activate the photocatalytic material. As such, the upconversion layer 42 is efficient, cost-effective, and lightweight and may eliminate additional ultraviolet electromagnetic radiation-generating components.

The substrate 12 may include the upconversion layer 42 or the upconversion layer 42 may be separately applied and disposed on the substrate 12 so as to be sandwiched between the self-cleaning film 14 and the substrate 12. In particular, the upconversion layer 42 may be formed from a suitable luminescent material including, but not limited to, a lanthanide-doped inorganic phosphor, an organic sensitizer/acceptor such as $Yb^{3+}$ dopants and $Er^-$ emitters, and the like in the form of, for example, nanocrystal suspensions, nano/microcrystalline powders, and polycrystalline ceramics.

As best shown in FIG. 2E, in one embodiment, the substrate 12 may be a display 212 and may include a backlight 48 configured for emitting the first electromagnetic radiation 44 towards the upconversion layer 42. That is, the display 212 and backlight 48 may project or emit the first electromagnetic radiation 44 towards the upconversion layer 42. The display 212 may be, for example, a liquid crystal display, an organic light emitting diode display, or an opaque surface and may be configured for presenting information to an operator via the backlight 48. In one non-limiting example, the display 212 may be a liquid crystal display disposed within a housing and configured for emitting an image. The display 212 may optically modulate the first electromagnetic radiation 44 and emit the image, which may eventually be visible to an operator as text, a diagram, an object, a shape, and the like. For example, the image may be visible to the operator as a speed of travel, driving directions, ambient temperature data, a warning, a level indicator, text, and the like.

Although not shown, the display 212 may include a passive matrix display arrangement or an active matrix display arrangement, i.e., a thin film transistor display arrangement. The passive matrix display arrangement may include a grid of conductors having one of a plurality of individual pixels disposed at each intersection in the grid. An electrical current may be transmitted across two conductors to control the operation and light of an individual pixel. Alternatively, the active matrix display arrangement may include a transistor at each intersection.

Further, although also not shown, the display 212 may include a first panel, which may include one or more polarizers configured for polarizing visible light, i.e., the first electromagnetic radiation 44 having a wavelength in the visible spectrum. The display 212 may include a projector configured for emitting the first electromagnetic radiation 44. The first electromagnetic radiation 44 may be polarized light. In particular, the first electromagnetic radiation 44 may have an s-polarization state or a p-polarization state. In addition, the display 212 may include optics to focus, magnify, refract, and/or reflect light, and may define one or more apertures. In a non-limiting example, the display 212 may emit the first electromagnetic radiation 44 from a light-emitting diode and/or the backlight 48. The display 212 may also include one or more optical foils disposed adjacent the first panel. Suitable optical foils may enhance a brightness or clarity of the image and may include a brightness enhancement film, a dual brightness enhancement film, a plurality of quantum dots, and combinations thereof.

In operation, as the backlight 48 emits the first electromagnetic radiation 44 through the upconversion layer 42, the upconversion layer 42 may convert the first electromagnetic radiation 44 to the second electromagnetic radiation 46 which may then transmit to the photocatalytic material of the self-cleaning film 14.

Referring now to FIG. 2C, in another embodiment, the substrate 12 may further include the anti-reflection film 50 disposed in contact with the self-cleaning film 14. That is, the substrate 12 may include the anti-reflection film 50 or the anti-reflection film 50 may be separately applied and disposed on the substrate 12 so as to be sandwiched between the self-cleaning film 14 and the substrate 12. The anti-reflection film 50 may be configured for reducing a reflection off the self-cleaning film system 10 and thereby improving an efficiency of the self-cleaning film system 10 since lost light in the system 10 may be minimized. As such, the self-cleaning film system 10 may have both self-cleaning capabilities and comparatively low reflectance.

The anti-reflection film 50 may be formed from an anti-reflection coating comprising alternating layers 52, 54, 56 of silicon dioxide and titanium dioxide. The alternating sheets or layers 52, 54, 56 of silicon dioxide and titanium dioxide may have a thickness 58, 60, 62 (FIG. 2C) of from 25 nm to 40 nm. Further, the thickness 58, 60, 62 of each layer 52, 54, 56 may be optimized as set forth below to achieve broadband, spectral performance over wide incident angles.

For example, as described with reference to FIG. 2C, the anti-reflection film 50 may include a first sheet 52 formed from titanium dioxide or other material having a comparatively low index of refraction. The first sheet 52 may be formed from titanium dioxide nanoparticles, may have a first thickness 58 of from 10 nm to 125 nm, e.g., 25 nm to 40 nm. In some embodiments, the first thickness 58 may be, for example, 15 nm or 20 nm or 30 nm or 33 nm or 35 nm or 45 nm or 50 nm or 55 nm or 60 nm or 70 nm or 80 nm or 90 nm or 100 nm or 110 nm, and may have a comparatively low index of refraction. The anti-reflection film 50 may include a second sheet 54 formed from silicon dioxide or another material having a comparatively high index of refraction and disposed on the first sheet 52. The second sheet 54 may be formed from silicon dioxide nanoparticles and may have a second thickness 60 of from 10 nm to 125 nm, e.g., 25 nm to 40 nm, and a comparatively high index of refraction. For example, the second thickness 60 may be 15 nm or 20 nm or 30 nm or 33 nm or 35 nm or 45 nm or 50 nm or 55 nm or 60 nm or 70 nm or 80 nm or 90 nm or 100 nm or 110 nm. The anti-reflection film 50 includes a third sheet 56 formed from titanium dioxide or other material having a comparatively low index of refraction and disposed on the second sheet 54 and in contact with the self-cleaning film 14. The third sheet 56 may have a third thickness 62 of from 10 nm to 125 nm, e.g., 25 nm to 35 nm, and a comparatively low index of refraction. The third thickness 62 may be 15 nm or 20 nm or 30 nm or 33 nm or 35 nm or 45 nm or 50 nm or 55 nm or 60 nm or 70 nm or 80 nm or 90 nm or 100 nm or 110 nm. In one specific embodiment, the third thickness may be 30 nm. Although not shown, the anti-reflection film 50 may also include more than three layers or sheets 52, 54, 56. For example, the substrate 12 or fourth layer may have a fourth thickness 66 of from 40 nm to 60 nm. The substrate 12 or fourth layer may be formed from silicon dioxide and may have a fourth thickness 66 of 45 nm or 50 nm or 55 nm. The substrate 12 or fourth layer may have a comparatively high index of refraction. Stated differently, for some embodiments, the anti-reflection film 50 may include four layers and the self-cleaning film 14 may be disposed on top of the anti-reflection film 50.

In other embodiments, the self-cleaning film 14 may replace the topmost layer of the anti-reflection film 50. Further, the oleophobic material may have an index of refraction of from about 1.2 to about 1.6, e.g., from about 1.3 to about 1.5, according to a percentage of any fluorine present in the oleophobic material. Consequently, the self-cleaning film system 10 may include a comparatively thicker monolayer 30 formed from the oleophobic material, which may in turn contribute to comparatively greater photocatalytic activity of the photocatalytic material. The oleophobic material may also be transparent and have excellent durability.

As set forth above, the self-cleaning film 14 includes the first plurality of regions 32 formed from or including the photocatalytic material. Such first plurality of regions 32 may be useful for removing fingerprints and other contaminants 100 from the self-cleaning film 14 so that the self-cleaning film 14 exhibits self-cleaning capability.

More specifically, during operation of the self-cleaning film system 10, the first plurality of regions 32 may be irradiated with electromagnetic radiation having a wavelength of from 400 nm to 100 nm, i.e., ultraviolet light. Alternatively, the first plurality of regions 32 may be irradiated with electromagnetic radiation having a wavelength of from 740 nm to 380 nm, i.e., visible light. That is, the light source 38 (FIG. 2A) or upconversion layer 42 (FIG. 2E) may be selected to emit electromagnetic radiation having a wavelength tuned to a bandgap of the photocatalytic material to initiate photocatalysis of the squalene or contaminant 100 deposited as a fingerprint. As used herein, the terminology bandgap refers to a difference in energy between the highest permitted energy level for an electron in a valence band of the photocatalytic material and the lowest permitted energy level in a conduction band of the photocatalytic material. In other words, the bandgap refers to the minimum amount of light required to make the photocatalytic material electrically conductive.

During use, an operator may deposit fingerprints, squalene, organic matter, contaminants 100, and/or oils onto the first surface 16 (FIG. 2A). Oils may include oils of fatty acids and may be synthesized naturally and applied to the self-cleaning film 14 as the operator touches the self-cleaning film 14, or may be applied to the self-cleaning film 14 artificially such as by spraying or coating. Contact between the squalene or contaminant 100 and the photocatalytic material which is exposed to electromagnetic radiation emitted by the light source 38 may initiate a photocatalytic reaction. More specifically, the photocatalytic material may be a photocatalyst. The photocatalytic reaction may create a strong oxidation agent and breakdown the organic matter, e.g., squalene, to carbon dioxide and water in the presence of the photocatalyst, i.e., the photocatalytic material; electromagnetic radiation, e.g., ultraviolet light; and water, e.g., humidity from ambient conditions. As such, the photocatalytic material not be consumed by the catalytic reaction, but may instead solely accelerate the photocatalytic reaction as a non-reactant.

In greater detail, when electromagnetic radiation having a desired wavelength illuminates the photocatalytic material, an electron from the valence band of the photocatalytic material may promote to the conduction band of the photocatalytic material, which in turn may create a hole in the valence band and an excess of negative charge or electron in the conduction band. The hole may assist oxidation and the electron may assist reduction. Generally, the hole may combine with water to produce a hydroxyl radical (.OH). The hole may also react directly with squalene or other organic material to increase an overall self-cleaning efficiency of the self-cleaning film 14. Similarly, oxygen in the ambient environment surrounding the photocatalytic material may be reduced by the electron to form a superoxide ion ($.O_2—$), which in turn may oxidize the organic material present on the self-cleaning film 14.

In addition, the hole may become trapped before recombination with the electron. For such situations, the photocatalytic material may be functionalized. For example, the photocatalytic material may be doped with, for example, palladium or ruthenium. The palladium or ruthenium may act as an electrocatalyst and may increase a transfer of electrons to oxygen molecules, which may in turn lower the occurrence of the recombination of electrons and holes.

Further, organic material that is present on the self-cleaning film 14 at the monolayer 30 rather than in direct contact with the first plurality of regions 32 may be in dynamic equilibrium with the first surface 16 (FIG. 2A) and may diffuse toward a comparatively higher-energy location on the self-cleaning film 14, i.e., the first plurality of regions 32. Therefore, the squalene or contaminant 100 may diffuse along the self-cleaning film 14 from the monolayer 30 to at least one of the first plurality of regions 32. To improve such diffusion, the light source 38 may be tuned to emit electromagnetic radiation having a wavelength that is tuned to a vibration resonance of the squalene and the fluorocarbon. Such tuning may enable the squalene or fingerprint to wiggle or translate along the monolayer 30 to the first plurality of regions 32 where the squalene or contaminant 100 may undergo the photocatalytic reaction described above. Alternatively or additionally, the self-cleaning film 14 may also be heated, for example by infrared radiation, to further improve diffusion across the monolayer 30 towards the first plurality of regions 32.

As such, the squalene or contaminant 100 may be vaporized. More specifically, once the contaminant 100 contacts the photocatalytic material at the first plurality of regions 32, the contaminant 100 may be photolyzed into comparatively low vapor pressure-sized pieces or parts, which may vaporize off the self-cleaning film 14 and thereby remove the fingerprint or contaminant 100 from the self-cleaning film 14. That is, the self-cleaning film 14 may protect the substrate 12 by removing, e.g., oxidizing and vaporizing the contaminant 100, i.e., the fingerprints, squalene, oils, pathogens, and/or organic material deposited by the touch of an operator. Consequently, the self-cleaning film system 10 and may provide excellent aesthetics, optical transparency, cleanliness, and readability for display systems, lenses, sensors, and surfaces.

While the best modes for carrying out the disclosure have been described in detail, those familiar with the art to which this disclosure relates will recognize various alternative designs and embodiments for practicing the disclosure within the scope of the appended claims.

What is claimed is:

1. A self-cleaning film system, the self-cleaning film system comprising:
   a substrate;
   a self-cleaning film disposed on the substrate and including:
   a monolayer formed from an oleophobic material; and
   a first plurality of regions disposed within the monolayer in a non-periodic pattern such that each of the first plurality of regions abuts and is surrounded by the oleophobic material selected from one of polytetrafluoroethylene and fluorinated diamond-like carbon, wherein each of the first plurality of regions includes a photocatalytic material; and
   a second plurality of regions disposed within the monolayer in a non-periodic pattern such that each of the second plurality of regions abuts and is surrounded by the oleophobic material, wherein each of the second plurality of regions comprise silver nanoparticles, wherein the silver nanoparticles are present in an amount of from about 2 parts by volume to about 35 parts by volume based on 100 parts by volume of the self-cleaning film.

2. The self-cleaning film system of claim 1, wherein the self-cleaning film has a first surface and a second surface spaced opposite the first surface and abutting the substrate, and further wherein the first surface is substantially free from squalene.

3. The self-cleaning film system of claim 2, wherein the first plurality of regions are not equally spaced apart from each other along the first surface.

4. The self-cleaning film system of claim 2, wherein the non-periodic pattern of the first plurality of regions and the non-periodic pattern of the second plurality of regions are non-repeating along the first surface such that the first plurality of regions and the second plurality of regions are randomly disposed along the first surface.

5. The self-cleaning film system of claim 2, wherein the oleophobic material and the photocatalytic material are present in the self-cleaning film in a ratio of parts by volume oleophobic material to parts by volume photocatalytic material of from 90:10 to 10:90.

6. The self-cleaning film system of claim 2, wherein each of the first plurality of regions has a diameter of less than or equal to 3 microns.

7. The self-cleaning film system of claim 2, wherein the monolayer has a thickness of from 5 nm to 15 nm.

8. The self-cleaning film system of claim 2, wherein the monolayer has a thickness of from 40 nm to 60 nm.

9. The self-cleaning film system of claim 2, wherein the photocatalytic material has an average diameter of from 30 nm to 70 nm.

10. The self-cleaning film system of claim 2, wherein the monolayer is formed from a plurality of fluorinated diamond-like carbon nanoparticles and has a thickness of from 5 nm to 60 nm.

11. The self-cleaning film system of claim 1, wherein the oleophobic material is polytetrafluoroethylene.

12. The self-cleaning film system of claim 1, wherein the oleophobic material is fluorinated diamond-like carbon.

13. The self-cleaning film system of claim 1, wherein the photocatalytic material is titanium dioxide and is present in the first plurality of regions in an anatase form.

14. The self-cleaning film system of claim 1, wherein the photocatalytic material is doped with silver.

15. The self-cleaning film system of claim 1, wherein the photocatalytic material includes silver and further wherein the substrate is an internal surface defined by a duct.

16. The self-cleaning film system of claim 1, wherein the substrate is formed from at least one of silicon dioxide and plastic.

17. The self-cleaning film system of claim 1, wherein the substrate further includes an adhesion layer formed from a sol-gel material and disposed in contact with the self-cleaning film; and further wherein the photocatalytic material is physically trapped in place by the adhesion layer.

18. The self-cleaning film system of claim 17, wherein the photocatalytic material is chemically bonded to the adhesion layer.

19. The self-cleaning film system of claim 17, wherein the photocatalytic material is doped with silver.

20. The self-cleaning film system of claim 1, wherein the substrate further includes an upconversion layer formed from a luminescent material and disposed in contact with the self-cleaning film, wherein the upconversion layer is configured for converting a first electromagnetic radiation having a wavelength of from 490 nm to 450 nm to a second electromagnetic radiation having an ultraviolet wavelength of from 10 nm to 400 nm.

21. The self-cleaning film system of claim 20, wherein the substrate is a display and includes a backlight configured for emitting the first electromagnetic radiation towards the upconversion layer.

22. The self-cleaning film system of claim 20, wherein the photocatalytic material is doped with silver.

23. The self-cleaning film system of claim 1, further including an anti-reflection film disposed on the substrate and in contact with the self-cleaning film, wherein the anti-reflection film includes:
 a first sheet formed from titanium dioxide;
 a second sheet formed from silicon dioxide and disposed on the first sheet; and
 a third sheet formed from titanium dioxide and disposed on the second sheet and in contact with the self-cleaning film.

24. The self-cleaning film system of claim 23, wherein:
 the first sheet comprises titanium dioxide nanoparticles and has a first thickness of from 25 nm to 40 nm;
 the second sheet comprises silicon dioxide nanoparticles and has a second thickness of from 25 nm to 40 nm;
 the third sheet comprises titanium dioxide nanoparticles and has a third thickness of from 25 nm to 35 nm; and
 the substrate has a fourth thickness of from 40 nm to 60 nm.

25. The self-cleaning film system of claim 23, wherein the photocatalytic material is doped with silver.

26. A self-cleaning film system for a display, the self-cleaning film system comprising:
 a substrate; and
 a self-cleaning film disposed on the substrate and including:
  a monolayer formed from an oleophobic material selected from one of polytetrafluoroethylene and fluorinated diamond-like carbon;
  a first plurality of regions disposed within the monolayer in a non-periodic pattern such that each of the first plurality of regions abuts and is surrounded by the oleophobic material, wherein each of the first plurality of regions includes titanium dioxide nanoparticles present in anatase form; AW
  a second plurality of regions disposed within the monolayer in a non-periodic pattern such that each of the second plurality of regions abuts and is surrounded by the oleophobic material, wherein each of the second plurality of regions comprise sliver nanoparticles, wherein the sliver nanoparticles are present in an amount of from about 2 parts by volume to about 35 parts by volume based on 100 parts by volume of the self-cleaning film;
  wherein the non-periodic pattern of the first plurality of regions is non-repeating such that the first plurality of regions are randomly disposed along the self-cleaning film and configured to scatter light so as to minimize diffraction;
  wherein the oleophobic material and the titanium dioxide are present in the self-cleaning film in a ratio of parts by volume oleophobic material to parts by volume titanium dioxide of 80:20;
  wherein each of the first plurality of regions has a diameter of less than or equal to 3 microns configured to reducing visible sparkles; and
  wherein the titanium dioxide has an average diameter of from 30 nm to 70 nm, and the substrate and the self-cleaning film are configured to transmit visible light, while reducing refracted light and visible sparkling.

27. The self-cleaning film system of claim 26, wherein the self-cleaning film has a first surface and a second surface spaced opposite the first surface and abutting the substrate, and further wherein the first surface is substantially free from squalene.

28. The self-cleaning film system of claim 27, wherein the monolayer is formed from a plurality of fluorinated diamond-like carbon nanoparticles and has a thickness of from 10 nm to 60 nm.

29. The self-cleaning film system of claim 28, wherein the substrate further includes an adhesion layer formed from a sol-gel material and disposed in contact with the self-cleaning film; and further wherein the photocatalytic material is physically trapped in place by the adhesion layer.

30. The self-cleaning film system of claim 28, wherein the substrate further includes an upconversion layer formed from a luminescent material and disposed in contact with the self-cleaning film, wherein the upconversion layer is configured for converting a first electromagnetic radiation having a wavelength of from 490 nm to 450 nm to a second electromagnetic radiation having an ultraviolet wavelength of from 10 nm to 400 nm.

31. The self-cleaning film system of claim 28, wherein the titanium dioxide is doped with silver.

32. A self-cleaning film system for a display, the self-cleaning film system comprising:
 a substrate;
 a self-cleaning film disposed on the substrate and including:
  a monolayer formed from an oleophobic material; and
  a first plurality of regions disposed within the monolayer in a non-periodic pattern such that each of the first plurality of regions abuts and is surrounded by the oleophobic material, wherein each of the first plurality of regions includes a photocatalytic material;
  wherein the non-periodic pattern is non-repeating such that the first plurality of regions are randomly disposed along the self-cleaning film and configured to scatter light so as to minimize diffraction; and
  a second plurality of regions disposed within the monolayer in a non-periodic pattern such that each of the second plurality of regions abuts and is surrounded by the oleophobic material wherein each of the second plurality of regions comprise silver nanoparticles, wherein the silver nanoparticles are present in an amount of from about 2 parts by volume to about 35 parts by volume based on 100 parts by volume of the self-cleaning film;
  wherein each of the first plurality of regions has a diameter of less than or equal to 3 microns configured to reduce visible sparkles;
 an anti-reflection film disposed on the substrate and in contact with the self-cleaning film and including:
  a first sheet formed from titanium dioxide;
  a second sheet formed from silicon dioxide and disposed on the first sheet; and
  a third sheet formed from titanium dioxide and disposed on the second sheet and in contact with the self-cleaning film, wherein the substrate, anti-reflection film, and the self-cleaning film are configured to transmit visible light, while reducing refracted light and visible sparkling;

an upconversion layer formed from a luminescent material and disposed in contact with the self-cleaning film, wherein the upconversion layer is configured for converting a first electromagnetic radiation having a wavelength of from 490 nm to 450 nm to a second electromagnetic radiation having an ultraviolet wavelength of from 10 nm to 400 nm; and an adhesion layer formed from a sol-gel material disposed between the substrate and the self-cleaning film, wherein the photocatalytic material is physically trapped in place by the adhesion layer.

33. The self-cleaning film system of claim 32, wherein the self-cleaning film has a first surface and a second surface spaced opposite the first surface and abutting the substrate, and further wherein the first surface is substantially free from squalene.

34. The self-cleaning film system of claim 33, wherein the photocatalytic material has an average diameter of from 40 nm to 60 nm.

35. The self-cleaning film system of claim 32, wherein the monolayer is formed from a plurality of fluorinated diamond-like carbon nanoparticles and has a thickness of from 5 nm to 60 nm.

36. The self-cleaning film system of claim 32, wherein the photocatalytic material is doped with silver.

* * * * *